(12) United States Patent
Song et al.

(10) Patent No.: US 8,509,587 B2
(45) Date of Patent: Aug. 13, 2013

(54) PORTABLE OPTICAL-FIBER PROCESSING EQUIPMENT

(75) Inventors: Jae Seop Song, Daejeon (KR); Sang Chul Jun, Chungcheongbuk-do (KR); Young Bae Seo, Chungcheongbuk-do (KR)

(73) Assignee: Ilsin Tech. Co., Ltd. (KR)

(*) Notice: Subject to any disclaimer, the term of this patent is extended or adjusted under 35 U.S.C. 154(b) by 0 days.

(21) Appl. No.: 13/296,453

(22) Filed: Nov. 15, 2011

(65) Prior Publication Data

US 2012/0174714 A1 Jul. 12, 2012

Related U.S. Application Data

(63) Continuation of application No. 11/912,109, filed as application No. PCT/KR2006/001487 on Apr. 20, 2006, now Pat. No. 8,092,100.

(30) Foreign Application Priority Data

Apr. 22, 2005 (KR) ................ 10-2005-0033376

(51) Int. Cl.
*G02B 6/255* (2006.01)
*G02B 6/00* (2006.01)

(52) U.S. Cl.
USPC .................... 385/135; 385/134; 385/99

(58) Field of Classification Search
USPC ........................... 385/99, 134, 135
See application file for complete search history.

(56) References Cited

U.S. PATENT DOCUMENTS

| 4,969,703 | A | * | 11/1990 | Fyfe et al. | 385/123 |
| 5,359,690 | A | * | 10/1994 | Kaizu et al. | 385/134 |
| 5,946,986 | A | | 9/1999 | Dodge et al. | |
| 5,949,940 | A | * | 9/1999 | Botelho et al. | 385/114 |
| 6,052,880 | A | * | 4/2000 | Basavanhally | 29/33.5 |

(Continued)

FOREIGN PATENT DOCUMENTS

| CN | 1209556 | 3/1999 |
| CN | 1209556 A | 3/1999 |

(Continued)

OTHER PUBLICATIONS

International Search Report, PCT/KR2006/001487, dated Aug. 8, 2006. The corresponding document was previously submitted in connection with U.S. Appl. No. 11/912,109 and is not being resubmitted herewith per 37 CFR 1.98(d).

*Primary Examiner* — K. Cyrus Kianni
(74) *Attorney, Agent, or Firm* — Park & Associates IP Law, P.C.

(57) ABSTRACT

A portable optical fiber processing apparatus is disclosed. The portable optical fiber processing apparatus of the present invention includes a base (1), which provides a space in which components are installed, and a sheathing stripping unit (10), which is provided on the base and strips sheathing from an optical fiber (R). The apparatus further includes an optical fiber cutting unit (40), which is provided on the base and cuts a portion of the optical fiber, from which the sheathing has been stripped, using a sliding cutter (43) in a direction perpendicular to the longitudinal direction of the optical fiber, and a welding unit (50), which is provided on the base and welds junction portions of two optical fibers. The present invention is characterized in that a process of stripping sheathing from an optical fiber and cutting, cleaning and welding processes can be conducted using a single apparatus.

2 Claims, 16 Drawing Sheets

(56) References Cited

U.S. PATENT DOCUMENTS

| | | | |
|---|---|---|---|
| 6,115,527 A * | 9/2000 | Lochkovic et al. | 385/134 |
| 6,122,936 A | 9/2000 | Csiples et al. | |
| 6,190,057 B1 * | 2/2001 | Osaka et al. | 385/96 |
| 6,222,969 B1 * | 4/2001 | Botelho et al. | 385/114 |
| 6,273,990 B1 * | 8/2001 | Bookbinder et al. | 156/714 |
| 6,582,527 B2 * | 6/2003 | Marazzi et al. | 134/42 |
| 6,643,448 B1 * | 11/2003 | Brewer et al. | 385/147 |
| 6,668,128 B2 * | 12/2003 | Hattori et al. | 385/136 |
| 6,783,597 B2 * | 8/2004 | Cronk et al. | 118/620 |
| 6,823,761 B2 * | 11/2004 | Chiang et al. | 81/9.51 |
| 6,978,071 B2 * | 12/2005 | Hwang et al. | 385/134 |
| 7,289,706 B2 * | 10/2007 | Chien et al. | 385/114 |
| 7,314,317 B2 * | 1/2008 | Hamasaki et al. | 385/62 |
| 7,316,513 B1 * | 1/2008 | Dacey | 385/95 |
| 2002/0031323 A1 * | 3/2002 | Hattori et al. | 385/137 |
| 2002/0064354 A1 | 5/2002 | Ware et al. | |
| 2002/0064355 A1 * | 5/2002 | Ware et al. | 385/95 |
| 2003/0081929 A1 * | 5/2003 | Lochkovic et al. | 385/147 |
| 2004/0055161 A1 * | 3/2004 | Chiang et al. | 30/90.4 |
| 2004/0120678 A1 * | 6/2004 | Hwang et al. | 385/134 |
| 2005/0213893 A1 * | 9/2005 | Hamasaki et al. | 385/80 |
| 2007/0122094 A1 * | 5/2007 | Chien et al. | 385/114 |

FOREIGN PATENT DOCUMENTS

| | | |
|---|---|---|
| CN | 1478210 | 2/2004 |
| CN | 1478210 A | 2/2004 |
| EP | 1302790 A1 | 4/2003 |
| JP | 05-224025 A | 9/1993 |
| JP | 07098421 | 4/1995 |
| JP | 07098421 A * | 4/1995 |
| JP | 9197156 A | 7/1997 |
| JP | 11-171574 A | 6/1999 |
| JP | 11171574 | 6/1999 |
| JP | 11-305047 A | 11/1999 |
| JP | 11305047 | 11/1999 |
| JP | 2000-180636 A | 6/2000 |
| JP | 2000180636 | 6/2000 |
| JP | 2001-296430 A | 10/2001 |
| JP | 2001296430 | 10/2001 |
| JP | 2001-330737 A | 11/2001 |
| JP | 2001330737 | 11/2001 |
| JP | 2002-006144 A | 1/2002 |
| JP | 2002-520632 A | 7/2002 |
| JP | 2002-286943 A | 10/2002 |
| JP | 2002286943 | 10/2002 |
| JP | 2003-075650 A | 3/2003 |
| JP | 2003075650 | 12/2003 |
| JP | 2004-157317 A | 6/2004 |
| JP | 2004157317 | 6/2004 |
| JP | 2004-527781 A | 9/2004 |
| JP | 2004527781 | 9/2004 |
| JP | 2005-215513 A | 8/2005 |
| JP | 2005215513 A | 8/2005 |
| WO | 02/44778 A1 | 6/2002 |
| WO | 0244778 A1 | 6/2002 |

* cited by examiner

PORTABLE OPTICAL-FIBER PROCESSING EQUIPMENT

TECHNICAL FIELD

The present invention relates, in general, to portable optical fiber processing apparatuses and, more particularly, to a portable optical fiber processing apparatus, which is constructed such that a process of stripping sheathing, which covers an optical fiber, and processes of cutting, cleaning and welding the stripped portion of the optical fiber can be conducted using a single apparatus, thus making it possible to conveniently and rapidly conduct work required at an optical cable installation site.

BACKGROUND ART

Generally, optical fiber processing apparatuses are used even in limited and poor surroundings, such as on telegraph poles and in manholes, as well as being used on level ground. In such surroundings, in the case of a conventional optical fiber connection process, a sheathing stripping process, a cleaning process, a cutting process, a welding process and a sleeve fitting process are consecutively conducted using different respective devices. For conducting the above-mentioned processes, a stripping device, a cleaning device, a cutting device and a welding device must be individually stored and carried, thus being inconvenient to a worker. For example, when conducting work on a telegraph pole, the worker, who climbs up the telegraph pole, conducts a desired process using a related device and, thereafter, he/she must pull another device out after having placed the previous device in its initial position. As such, in the conventional art, the worker must conduct work in poor conditions.

To solve the above-mentioned problem, the object of the present invention is to develop a portable optical fiber processing apparatus, which has a structure such that several combined processes can be conducted using only a single apparatus which can be conveniently stored and carried.

As well known to those skilled in the art, an optical fiber is a strand-shaped wave guide tube for the transmission of light. Furthermore, several strands of optical fibers constitute an optical cable, and such an optical cable has been widely used. Such an optical fiber includes a core, which is placed at the central portion thereof, and cladding, which covers the core, thus forming a double cylindrical structure. This cylindrical fiber is covered with double or triple sheathing made of synthetic resin.

The optical fiber prevents interference and jamming from being caused by outside electromagnetic waves and prevents wiretapping. Furthermore, the optical fiber is small and light and is resistant to bending. As well, a single optical fiber can support a plurality of communication lines and is resistant to changes in external conditions. Therefore, optical fibers are widely used.

To manufacture a device using a single-core or multicore optical fiber or to weld two together, the optical fiber, which is typically covered with sheathing, must undergo a process of stripping the sheathing and a process of cleaning and cutting the optical fiber. The two processed optical fibers must then undergo a welding process.

However, in the conventional arts, when conducting these processes, because the processes must be conducted using respective devices or through manual work, the work is inconvenient to the user and, as well, time is wasted. In addition, when there is only a small amount of work, there is no particular problem, but when there is a large amount of work, there is a problem of reduced work efficiency.

In an effort to overcome the above-mentioned problems of inconvenient work, an apparatus, which has a structure such that several processes, of stripping sheathing from an optical fiber and cleaning, cutting and welding the optical fiber, can be conducted using only the apparatus, was proposed in Korean Patent Application No. 2004-24067 (entitled: Optical Fiber Welding and Splicing Apparatus Having Heating Chamber for Reinforcing Welded Part of Optical Fiber, and, hereinafter, referred as a prior invention), which was filed by the inventor of the present invention.

In the prior invention, a process of stripping sheathing from an optical fiber and of cleaning it is conducted using hot blast. Thereafter, the optical fiber is cut to a desired length. Two cut optical fibers are welded at a junction therebetween, and a process of fitting a sleeve on the welded optical fibers is conducted in a heating chamber. As such, the prior invention is constructed such that the optical fiber can be processed through combined processes.

In the prior invention having a structure making it possible to conduct combined processes, there is an advantage in that the work efficiency of the process is maximized. However, because a large amount of heat is required, there is a disadvantage in that a separate generator and high voltage are required. Therefore, it is difficult to apply the prior invention to cable network construction. Furthermore, because sheathing of an optical fiber has a different characteristic, that is, a different temperature, at which the sheathing must be removed, depending on the manufacturing company, a problem occurs in which the sheathing is not removable. In addition, the process of stripping the sheathing from and cleaning the optical fiber using hot blast cannot be applied to a process of stripping sheathing from a multicore optical fiber, which includes several optical fibers, and cleaning it. That is, the process using hot blast is limitedly used in an apparatus of processing only a single-core optical fiber.

Meanwhile, an optical fiber processing apparatus to be used in a factory, in which a device for stripping sheathing from optical fibers and devices for cleaning and cutting the optical fibers are integrated and automated for mass production, was proposed in US Patent No. 2002-64354. However, this optical fiber processing apparatus has a complex structure and a relatively large size, and incurs high manufacturing costs. As well, because apparatus required to be portable, for example, a sealing apparatus, are not sufficiently portable, it is not appropriate to use them at an optical cable installation site, such as work in a manhole or on a telegraph pole.

Here, the number of optical fibers of the multicore optical fiber is determined depending on the kind and amount of optical data to be transmitted. In order to manufacture the multicore optical fiber, a desired number of optical fibers is arranged, and the arranged optical fibers are processed by a coating process, thus forming multilayer sheathing. Because the external shape of this multicore optical fiber has a band shape, it is called a "ribbon".

In the present invention, a blade body of a cutting blade is made of synthetic diamond having high stiffness, so that the durability of the cutting blade is enhanced. Thereby, inconvenience due to replacement of the cutting blade is minimized and maintenance cost is reduced. Furthermore, the amount of synthetic diamond required for manufacturing the cutting blade is minimized, so that manufacturing costs are reduced.

Meanwhile, in the conventional arts, a process of cutting an optical fiber has been conducted manually. Recently, an optical fiber cutting device, which supports an optical fiber on a main body and cuts the fastened optical fiber using a cutting blade, was developed.

In the conventional optical fiber cutting device, because a cutting blade, which contacts, cuts, and scratches an optical fiber, is made of material having insufficient stiffness, there is a problem of low durability. For example, in the case that the cutting blade is made of metal, the cutting blade is easily worn and damaged by repeated cutting work, so that the cutting blade must be frequently and periodically replaced with a new one. Even if the cutting blade is made of cemented carbide alloy having relatively high stiffness, it must be replaced with a new one after about 20000 to 30000 cuts have been made (a process of cutting one strand of optical fiber is regarded as one cut). Therefore, the conventional optical fiber cutting device has a disadvantage of inconvenience in maintenance and repairing. Furthermore, due thereto, a secondary problem, in which work time is increased, is induced.

Moreover, the conventional optical fiber cutting device has no construction for collecting a cut part of an optical fiber (hereinafter, referred as an optical fiber chip). Therefore, optical fiber chips are directly discarded at a construction site, thus resulting in environmental pollution. As well, because the optical fiber chips are sprayed when being cut at a construction site, the worker's body may be injured by the chips.

In the present invention, because an optical fiber chip, which is created when cutting the optical fiber at a construction site, is automatically collected through the manipulation of closing a cover, that is, through a single manipulation, it is environment-friendly, the user's body is prevented from being injured by chips, and the optical fiber processing operation is more convenient for the user.

Furthermore, in the conventional optical fiber processing apparatus, there is a problem in that the replacement and work of maintaining and repairing parts of the apparatus must be conducted at a manufacturing facility but not at a construction site, after the apparatus has been carried to the manufacturing facility. As well, because the conventional optical fiber processing apparatus is a machine having several components, which are precisely assembled together, the above-mentioned problem is more severe.

DISCLOSURE

Technical Problem

The single-core optical fiber has a disadvantage in that a high voltage is required, and has a problem in that it is difficult to strip the sheathing therefrom. In the case of the ribbon optical fiber, because a process of stripping the sheathing therefrom and processes of cleaning and cutting it cannot be conducted using the prior invention, every process must be conducted using a separate device.

As such, in the conventional art, because several separate devices are required, if the worker must conduct work at several construction sites, the weight of several devices burdens the worker. Furthermore, for every processing operation, because the worker must conduct the operation after selecting the related device, there are problems in that it is very inconvenient and work time is increased.

Particularly, in the cleaning process of the conventional art, the portion of the optical fiber from which the sheathing is removed is manually cleaned using absorbent cotton, on which cleaning water such as alcohol is sprayed. In this case, the outer surface of the optical fiber may be scratched by absorbent cotton or by the hand holding the absorbent cotton. As well, because a gap between optical fibers, which are arranged in several rows, is very narrow, residue from the sheathing remains in the gap so that the residue may not be removed.

To solve this problem, a method of cleaning an optical fiber using an ultrasonic cleaning device was proposed. However, in the case of the ultrasonic cleaning device, a separate container, which container therein cleaning water for cleaning the optical fiber, is required. Therefore, due to the inconvenience of carrying cleaning water, which is liquid, there is a problem in that it is difficult to realize a combined processing apparatus that includes the ultrasonic cleaning device.

Meanwhile, in the above-mentioned apparatus, to strip the sheathing from an optical fiber, to clean and cut the optical fiber, a process of heating the sheathing, a process of generating ultrasonic waves and a process of cutting the optical fiber are conducted. Here, these processes causes problems in that, because each device, which conducts each process, requires a separate control unit, the overall process is complicated, and the devices are expensive, so that the costs of manufacturing the products are increased.

In the present invention, a cutting blade, which contacts an optical fiber, is made of material having high hardness, so that the durability of the apparatus is increased and, as well, inconvenience due to replacement of the cutting blade is minimized and maintenance costs are reduced. Furthermore, the amount of synthetic diamond required for manufacturing the cutting blade is minimized, so that manufacturing costs are reduced.

Furthermore, in the optical process apparatus of the present invention, optical fiber chips, which are created when cutting the optical fiber at a construction site, are automatically collected by the manipulation of closing a cover, that is, through a single manipulation, so that it the process is environment-friendly, the user's body is prevented from being injured by the chips, and the optical fiber processing operation is more convenient for the user.

Accordingly, the present invention has been made keeping in mind the above problems occurring in the prior art, and an object of the present invention is to provide a portable optical fiber processing apparatus, in which a process of stripping sheathing from an optical fiber and cutting and welding processes are integrally conducted, and cleaning and sleeve fitting processes are conducted using a single apparatus.

Advantageous Effects

In the present invention, a process of stripping sheathing from an optical fiber and processes of cutting, cleaning and welding the stripped portion of the optical fiber can be conducted using a single apparatus, thus realizing lightness of the apparatus, and making it possible to conveniently conduct work, thereby increasing productivity.

Furthermore, the optical fiber processing apparatus of the present invention is portable. As well, because optical fiber chips, which are generated when cutting the optical fiber at a construction site, are automatically collected by the manipulation of closing a cover, that is, through a single manipulation, working convenience is increased, an environment-friendly work environment can be promoted, and the user's body is prevented from being injured by the optical fiber chips.

In addition, electric control of the optical fiber sheathing stripping process and the cleaning and welding processes is continuously conducted in the single apparatus, so that continuity of the processes is promoted, the processes can be conveniently conducted, and the component costs of the apparatus are reduced.

Moreover, in the present invention, a blade body of a cutting blade is made of synthetic diamond having high stiffness, so that the durability of the cutting blade is enhanced. Thereby, inconvenience due to replacement of the cutting blade is minimized and the maintenance cost is reduced.

Furthermore, in the present invention, because electric control of the optical fiber sheathing stripping process and the cleaning and welding processes is continuously conducted in the single apparatus, a problem of inconvenience in work is solved, and costs of manufacturing the product are reduced.

BEST MODE

Figure 1:
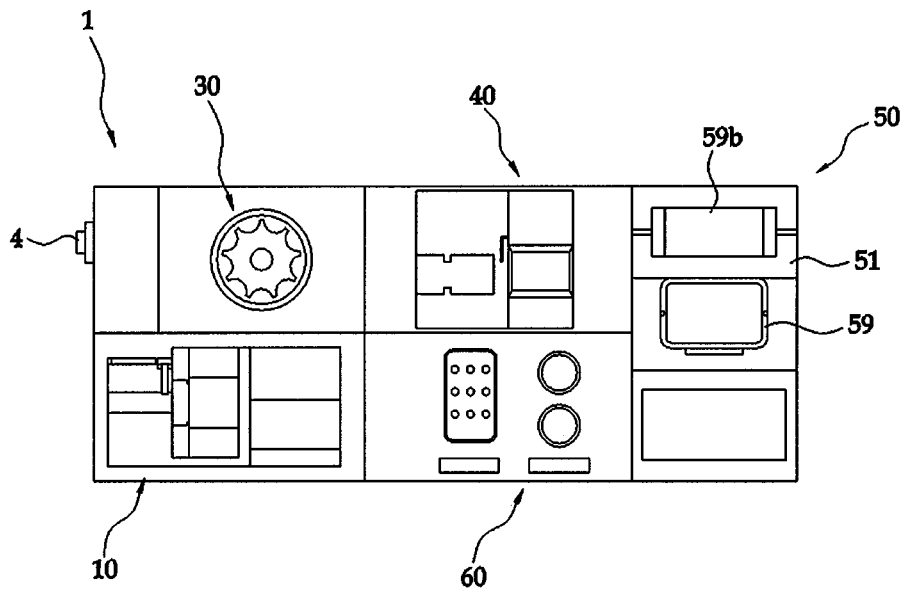
FIG. 1 is a plan view showing a portable optical fiber processing apparatus, according to the present invention.

The present invention provides a portable optical fiber processing apparatus, including: a base, providing a space in which components for processing an optical fiber are installed; a sheathing stripping unit provided on the base, holding the optical fiber such that an end of the optical fiber protrudes a predetermined length therefrom, and stripping sheathing from the optical fiber using a heating motion method, in which the protruding end of the optical fiber is heated and moved while being held by a stripping tool, or using an unheated motion method, in which the protruding end of the optical fiber is moved without being heated; an optical fiber cutting unit provided on the base, holding the optical fiber, and cutting a portion of the optical fiber, from which the sheathing is stripped, using a sliding cutter in a direction perpendicular to the longitudinal direction of the optical fiber; and a welding unit provided on the base so that a pair of optical fibers may be placed at opposite sides such that ends of the optical fibers face and contact each other, so as to weld junction portions of the optical fibers using an arc generated by a welding device of the welding unit. The above-mentioned units may be selectively and integrally provided on the base.

The present invention may further include a cleaning unit, which is provided on the base to remove sheathing residue from a portion of the optical fiber, from which the sheathing has been stripped, using cleaning water contained in a container.

Furthermore, the present invention may further include a sleeve processing unit, which is provided in the welding unit. In the sleeve processing unit, a contraction sleeve is fitted over the welded portion of the optical fiber and is heated, thus protecting the welded portion of the optical fiber.

In the present invention, the cleaning unit includes: a main body provided on the base; the container provided in the main body, generating ultrasonic waves, and being open at an upper end thereof such that the portion of the optical fiber, from which the sheathing has been stripped, is immersed in the cleaning water contained in the container; a mounting cover coupled to the open upper end of the container to cover an opening of the container and allowing the optical fiber to be inserted into the container therethrough; a lid removably coupled to the mounting cover to close a portion of the mounting cover, through which the optical fiber is inserted; and a sealing member provided at each of the junctions between the container and the mounting cover and between the mounting cover and the lid. Furthermore, the cutting unit may be constructed such that a cut optical fiber chip is inserted into a chip collection container through a gear and roller, which are operated in conjunction with the cover of the optical fiber cutting unit.

The present invention may further include a control unit, which electrically connects the sheathing stripping unit, the cleaning unit and the welding unit together, so that the control unit electrically controls a heating operation for conducting the sheathing stripping process and the sleeve fitting process, the power supply for generating ultrasonic waves, temperature regulation, and the frequency of ultrasonic waves.

Hereinafter, embodiments of the present invention having the above-mentioned construction will be described in detail with reference to the attached drawings.

FIG. 1 is a plan view showing a portable optical fiber processing apparatus, according to the present invention.

The portable optical fiber processing apparatus basically includes a base 1, a sheathing stripping unit 10, an ultrasonic cleaning unit 30 and an optical fiber cutting unit 40. A welding unit 50 and a control unit 60 are additionally provided on the base 1.

The base 1 is configured to have a plate shape and a box shape having an open upper end and provides therein a space in which components for processing an optical fiber (R) are installed.

Figure 2:
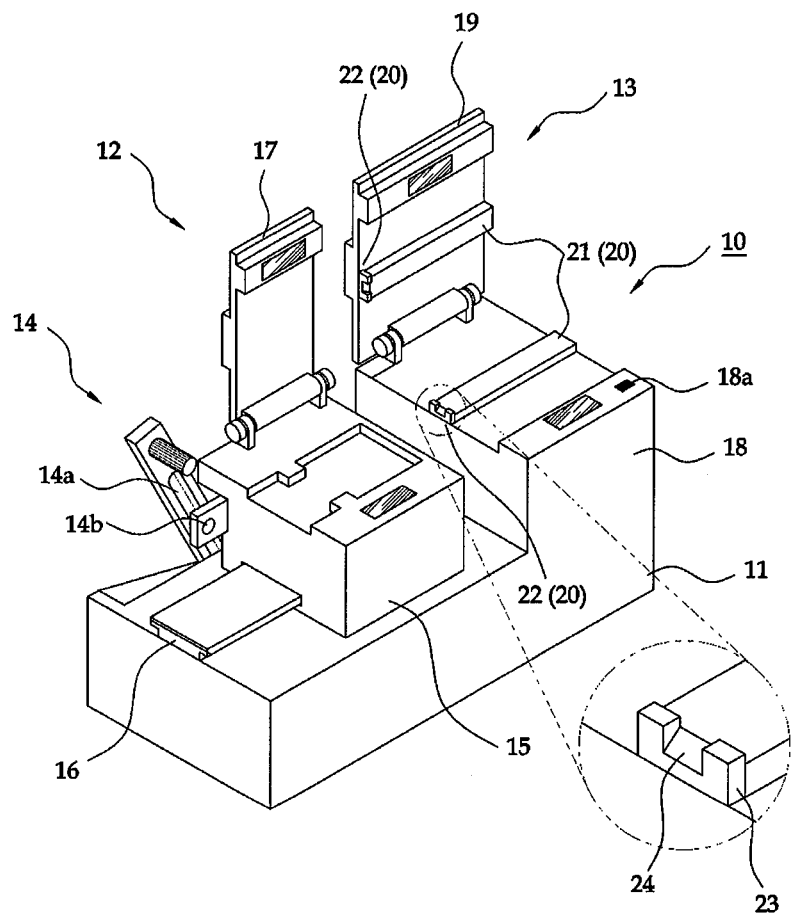
FIG. 2 is a perspective view of a sheathing stripping unit of the portable optical fiber processing apparatus of the present invention.
Figure 3:
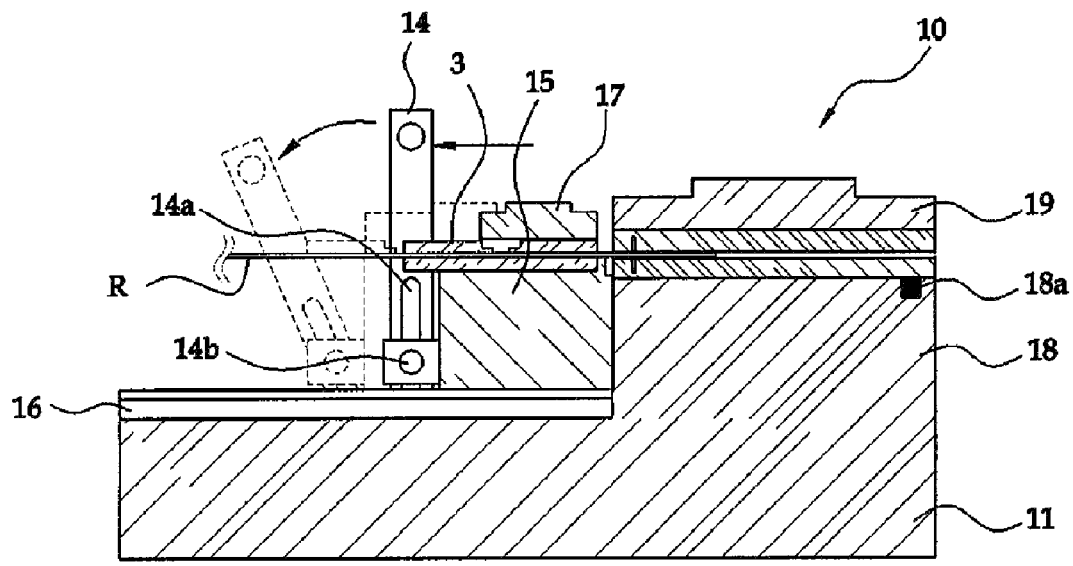
FIG. 3A are respectively a schematic sectional view showing the sheathing stripping unit of FIG. 2.

FIG. 2 is a perspective view of the sheathing stripping unit of the portable optical fiber processing apparatus of the present invention. FIG. 3 is a schematic sectional view showing the sheathing stripping unit of FIG. 2.

The sheathing stripping unit 10, a main body 11 of which is fastened to the base 1, includes a holder 12, which is provided on an upper part of the main body 11 so as to be slidable on the main body 11 and hold the optical fiber (R), a removal unit 13, which removes an end of the optical fiber (R) held by the holder 12, and a sliding means, which moves the holder 12 to remove the sheathing from the optical fiber (R).

Here, to realize the slidable structure, the holder 12 has a structure such that a slide block 15 thereof is movably coupled to a rail 16 provided on the main body 11. A cover 17, which holds and supports the optical fiber (R), is hinged to the slide block 15.

To fasten the optical fiber (R) to the holder 12, the optical fiber (R) is clamped by a fiber holder 3. The fiber holder 3 has a well known construction in which the optical fiber (R) is placed on a fiber holder block and is locked by a fiber holder cover.

The removal unit 13 includes a protruding support body 18, which protrudes from the main body 11, and a stripping cover 19, which is coupled to the protruding support body 18 by a hinge. Furthermore, a stripping means 20, which strips the sheathing from the optical fiber (R), is provided on the protruding support body 18 and the stripping cover 19 at predetermined positions, at which the optical fiber (R) is disposed between the protruding support body 18 and the stripping cover 19.

The stripping means 20 includes heating blocks 21 and stripping tools 22 which are provided on the protruding support body 18 and the stripping cover 19. The heating blocks 21 contact upper and lower surfaces of the optical fiber (R) and heat the sheathing of the optical fiber (R). The stripping tools 22 serve to strip the heated sheathing from the optical fiber (R) and include protrusions 23, which are respectively provided on facing surfaces of the protruding support body 18 and the stripping cover 19 so as to be in surface contact with each other, and stripping blades 24, which are provided in the respective protrusions 23 and face each other.

Here, the heating blocks 21 are heating elements, which receive power under the control of the control unit 60, which will be explained later herein, and generate heat. For convenience in manufacturing, both of the heating blocks 21, which are provided on the protruding support body 18 and the stripping cover 19, may be heating elements or, alternatively, only one of them may be a heating element. Furthermore, a construction may be devised such that, when it is not necessary to heat the optical fiber (R), that is, in the case that the optical fiber (R) is moved without being heated (in the case that a medial portion of the optical fiber is stripped), neither heating block 21 is heated. In this case, the heating blocks 21 serve as guides, which guide the optical fiber (R).

As such, in the present invention, as a method of stripping the sheathing from the optical fiber (R), both a heating motion manner and an unheated motion manner can be used. Here, the heating motion manner means that the optical fiber (R) is heated and moved before being stripped. The unheated motion manner means that the optical fiber (R) is moved and stripped without being heated.

Particularly, when it is desirable to strip a medial portion of the optical fiber, it is preferable that the sheathing be stripped from the optical fiber without being heated. In the present invention, because the process of stripping the sheathing from the optical fiber may be conducted in the unheated motion manner, the above-mentioned purpose can be achieved.

Meanwhile, the sliding means serves to slide the holder 12 on the main body 11, such that, when the holder 12 slides, the stripping blades 24 interfere with the sheathing of the optical fiber (R), which has been heated by the heating blocks 21, and which is thus stripped.

The sliding means includes a lever 14, which is hinged at an end thereof to the main body 11 so as to be rotatable around a hinge point. Furthermore, in the sliding means, a slot 14a is formed in the lever 14 at a position spaced apart from the hinge point by a predetermined distance (a preset distance to ensure the sliding movement of the slider by rotation of the lever). A coupling pin 14b, which protrudes from the holder 12, is slidably inserted into the slot 14a.

Furthermore, a sensor 18a, which detects whether part of the stripping cover 19 contacts the protruding support body 18 when the protruding support body 18 is covered with the stripping cover 19 after the optical fiber (R) has been placed, is provided in the protruding support body 18. The sensor 18a is connected to the control unit 60, which will be explained later herein, so that the control unit 60 calculates the time during which the sheathing of the optical fiber is heated by the heating blocks 21 using the sensor 18a.

That is, the control unit 60 measures the heating time using the sensor 18a and determines and indicates the time to strip the sheathing from the optical fiber.

Meanwhile, another embodiment of the sliding means, which moves the holder, will be described herein below.

Figure 3A:
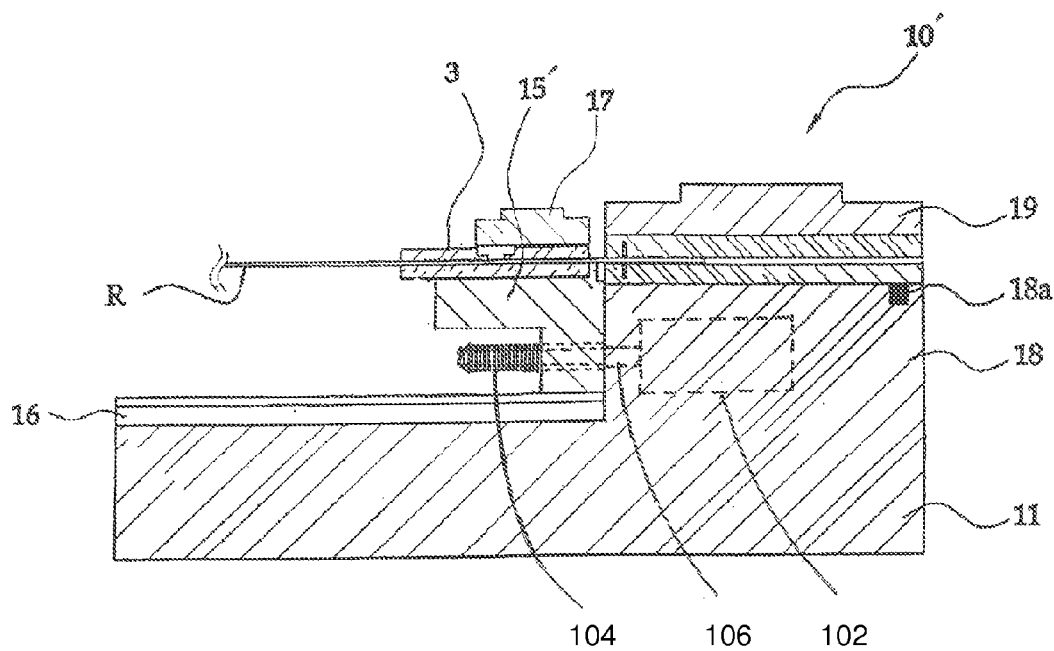

The other embodiment of the sliding means, which moves the holder 12, has a structure such that the holder 12 is movable along the rail 16 of the main body 11 by a motor 102. As illustrated in FIG. 3A of the drawings, the motor 102 is installed in the main body 11, and a screw 104, which is coupled to the output shaft 106 of the motor, is connected to the slide block 15' of the holder 12 such that they are operated in conjunction with each other. Then, the holder 12 can be moved by the motor 102. As well, the distance that the holder 12 is moved can be set and adjusted by construction such that the motor is controlled by the control unit 60, which will be explained later herein.

Figure 4:
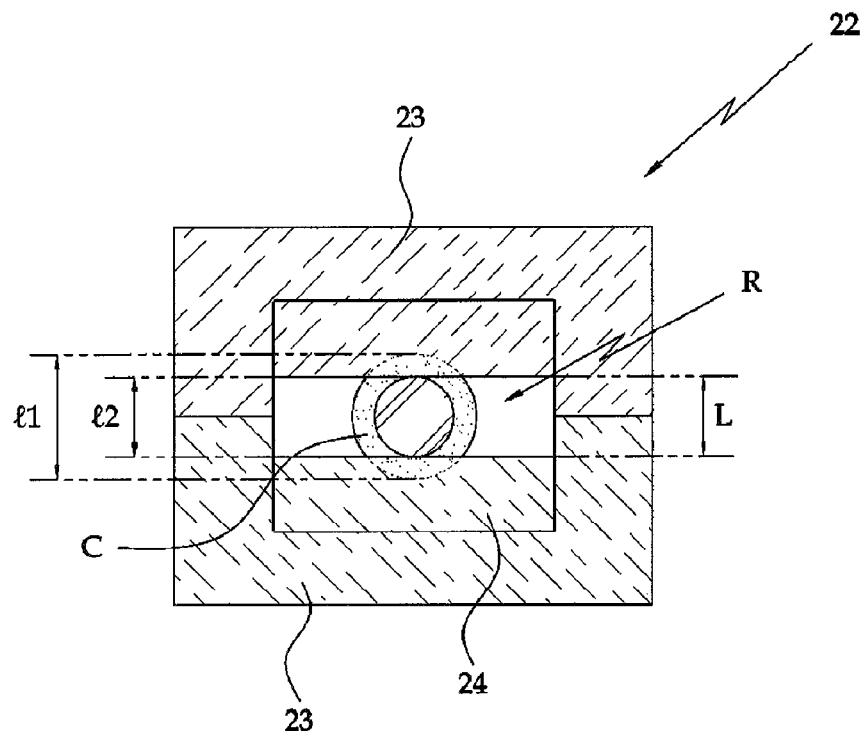
FIG. 4 is a partial sectional view showing the state of an optical fiber seated in the sheathing stripping unit of the portable optical fiber processing apparatus according to the present invention.

FIG. 4 is a partial sectional view showing the state of the optical fiber seated in the sheathing stripping unit of the portable optical fiber processing apparatus according to the present invention.

When the protrusions 23 come into contact with each other, the stripping blades 24 must be spaced apart from each other by a predetermined distance. For this, the junction parts of each protrusion 23 must protrude further than the stripping blade 24. Due to this construction, the junction parts of the protrusions 23 serve as stoppers, which prevent the stripping blades 24 from contacting the cladding of the optical fiber (R) when stripping the sheathing from the optical fiber (R). Due to this construction, the distance between the stripping blades of the protrusions is greater than the diameter of the cladding layer of the optical fiber, so that the range of depth to which the stripping blades 24 can be inserted into the optical fiber (R) is limited to the sheathing layer (C) of the optical fiber (R).

Furthermore, it is preferable that each stripping blade 24 have an edge, which is inclined at a predetermined angle and is thus configured such that the edge which contacts the optical fiber (R) is sharp. Although not shown in the drawings, the stripping blade 24 may have a stepped structure in place of the inclined structure.

Furthermore, as shown in FIG. 4, when the protrusions 23 come into contact with each other, a rectangular space is defined between the stripping blades. The reason for this is that the junction parts of the protrusions protrude further than the stripping blades and the edges of the blades are linear.

A preferred range of the distance between the stripping blades 24, which are spaced apart from each other, is presented in detail below.

When the distance between the stripping blades is L, the thickness of the optical fiber including the sheathing layer is $l_1$, and the thickness of the optical fiber not including the sheathing layer is $l_2$, it is preferable that the distance L between the stripping blades 24 be within a range of $l_2 \leqq L \leqq l_2 + (l_1 - l_2)/3$.

Due to this construction, in a process of stripping the sheathing from the optical fiber, the holder 12 can reliably support the optical fiber (R) without moving it, and the stripping blades 24 are limitedly inserted into the optical fiber (R) to the depth only of the sheathing layer (C) of the optical fiber (R). In this process, when the holder 12 is moved, the sheathing is easily stripped from the optical fiber (R). In detail, due to the junction parts of the protrusions 23 serving as the stoppers, only the core and cladding of the optical fiber (R) can be placed in the space defined between the stripping blades 24. Therefore, when the holder 12 slides, the stripping blades 24 strip only the sheathing layer from the optical fiber (R) without damaging the core and cladding of the optical fiber (R), that is, without cracking or scratching the core and cladding of the optical fiber (R).

Figure 5:
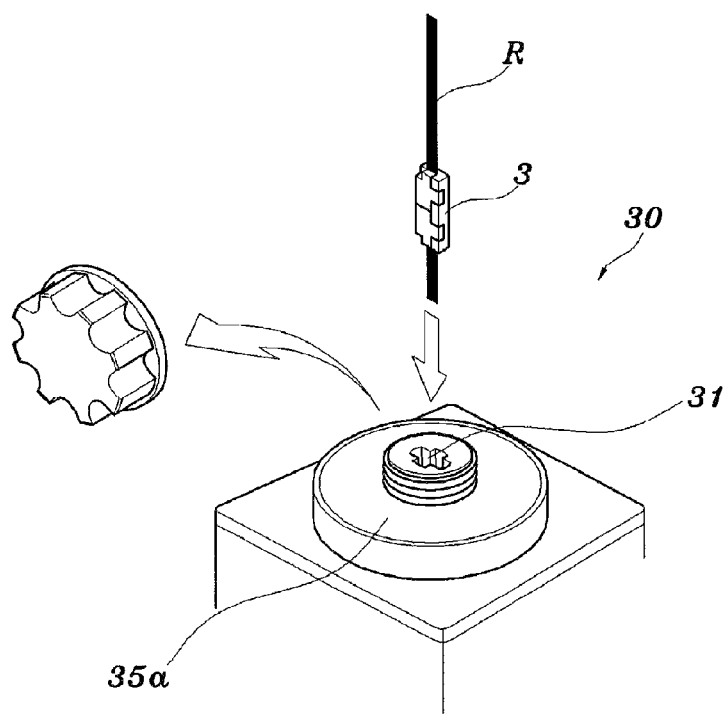
FIG. 5 is a partial perspective view showing an ultrasonic cleaning unit of the portable optical fiber processing apparatus according to the present invention.
Figure 6:
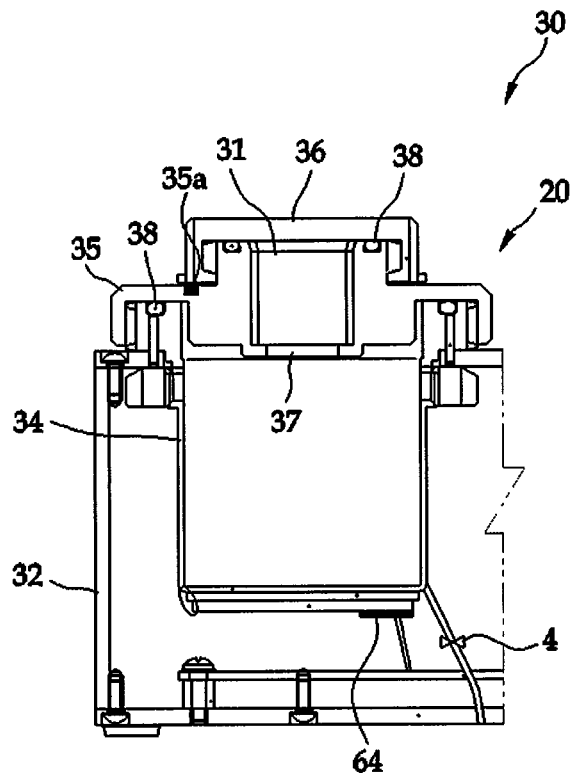
FIG. 6 is a schematic sectional view showing the ultrasonic cleaning unit of FIG. 5.
Figure 7:
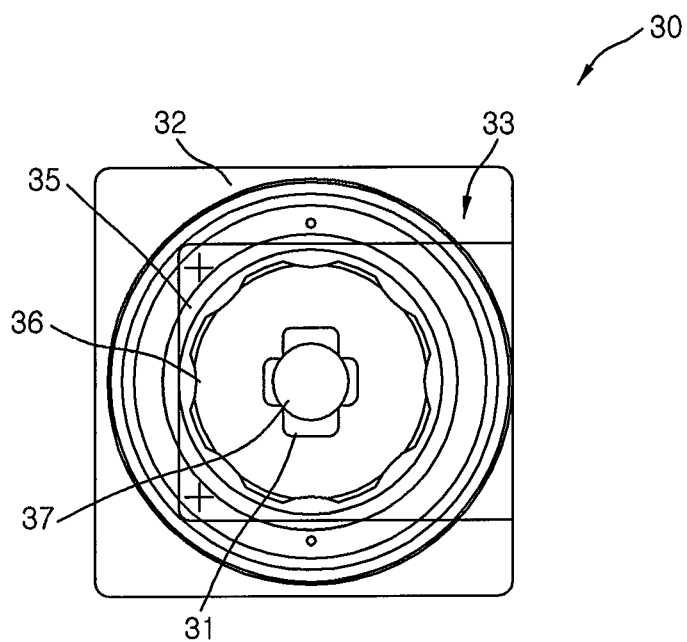
FIG. 7 is a schematic plan view showing the ultrasonic cleaning unit of FIG. 5.

FIGS. 5, 6 and 7 illustrate the ultrasonic cleaning unit. FIG. 5 is a perspective view showing the ultrasonic cleaning unit of the portable optical fiber processing apparatus of the present invention. FIG. 6 is a sectional view of the ultrasonic cleaning unit shown in FIG. 5. FIG. 7 is a plan view of the ultrasonic cleaning unit shown in FIG. 5.

The ultrasonic cleaning nit 30 generates ultrasonic waves in a container which contains therein cleaning water. Thus, when the stripped part of the optical fiber (R) is immersed in the cleaning water, sheathing residue is removed from the optical fiber.

The ultrasonic cleaning unit 30 is mounted on the base 1 and includes a main body 32 and a cleaning device 33. The cleaning device 33 has a construction in which a mounting cover 35 and a lid 36 are coupled to the upper end of the container 34, which is installed in the main body 32.

Cleaning water, which cleans the end of the optical fiber (R) after the sheathing has been removed from the optical fiber (R), is contained in the container 34. Here, alcohol is mainly used as the cleaning water.

The mounting cover 35 is coupled to the container 34 and serves to first cover the upper end of the container 34 which is open and is exposed from the main body 32. To removably attach the mounting cover 35 to the container 34, the container 34 and the mounting cover 35 are coupled to each other using a coupling screw. A mounting seat 31, into which a fiber holder 3 holding the optical fiber (R) is seated, is formed at a central portion in the mounting cover 35.

Here, the mounting cover 35 is constructed such that, when the fiber holder 3 is mounted to the mounting cover 35, a desired part of the optical fiber is placed at a height appropriate to be immersed in the cleaning water. The mounting seat 31 has a rectangular shape corresponding to the thickness, width, and length of the fiber holder 3. Of course, a through hole 37 is formed in the bottom of the mounting seat 31 such that the desired part of the optical fiber (R) can be immersed in the cleaning water through the mounting cover 35.

Preferably, to accommodate several kinds and sizes of fiber holders 3, two or more mounting seats 31, having different thicknesses and widths, are radially formed at predetermined angular intervals around the center of the through hole 37.

Furthermore, a sensor 35a is provided at a predetermined position in the mounting cover 35 or the main body 32, so that, when part of the user's body contacts/approaches it to place the optical fiber or moves away from it, ultrasonic cleaning operation is started or stopped in response to the sensor 35a.

Here, the sensor 35a is connected to a micro processor 62 in the control unit 60 and is controlled with other components together by the control unit.

Furthermore, the lid 36 is coupled to the mounting cover 35 to close the mounting cover 35, which is open through the through hole 37 of the mounting seat 31. The lid 36 is removably coupled to the mounting cover 35 using a screw.

Here, O-rings 38 are interposed between the container 34 and the mounting cover 35 and between the mounting cover 35 and the lid 36 so as to reliably seal the junctions. As shown in the drawings, the O-rings 38 are respectively provided in the container 34 at the junction between the container 34 and the mounting cover 35 and in the mounting cover 35 at the junction between the mounting cover 35 and the lid 36.

In the ultrasonic cleaning unit 30 having the above-mentioned construction, the optical fiber (R) is coupled to the fiber holder 3, and, thereafter, the fiber holder 3 is seated in the mounting seat 31 such that the part of the optical fiber (R) from which the sheathing has been removed is immersed in the cleaning water. Then, the ultrasonic cleaning operation is conducted.

Furthermore, a drain passage, which communicates with the container 34, is formed in the base 1, so that the used cleaning water is discharged outside through the drain passage after the cleaning operation has been completed. As well, a valve 4, which opens/closes the drain passage to control the discharge of the cleaning water, is provided in the base 1.

Thanks to this construction of the ultrasonic cleaning unit 30, the container 34 is openably and reliably sealed, so that it can be stably carried and moved even when cleaning water is stored in the container 34. Therefore, the present invention can ensure the stability of the optical fiber processing apparatus including the ultrasonic cleaning unit 30 when carrying and moving it. In the drawings, the reference numeral 64 denotes an ultrasonic wave generator connected to the control unit 60 of FIG. 11. Meanwhile, in place of the ultrasonic cleaning unit, a pump type or spray type cleaning unit, which conducts cleaning operation in a manual manner, may be provided on the base. This also falls within the bounds of the present invention.

Figure 8:
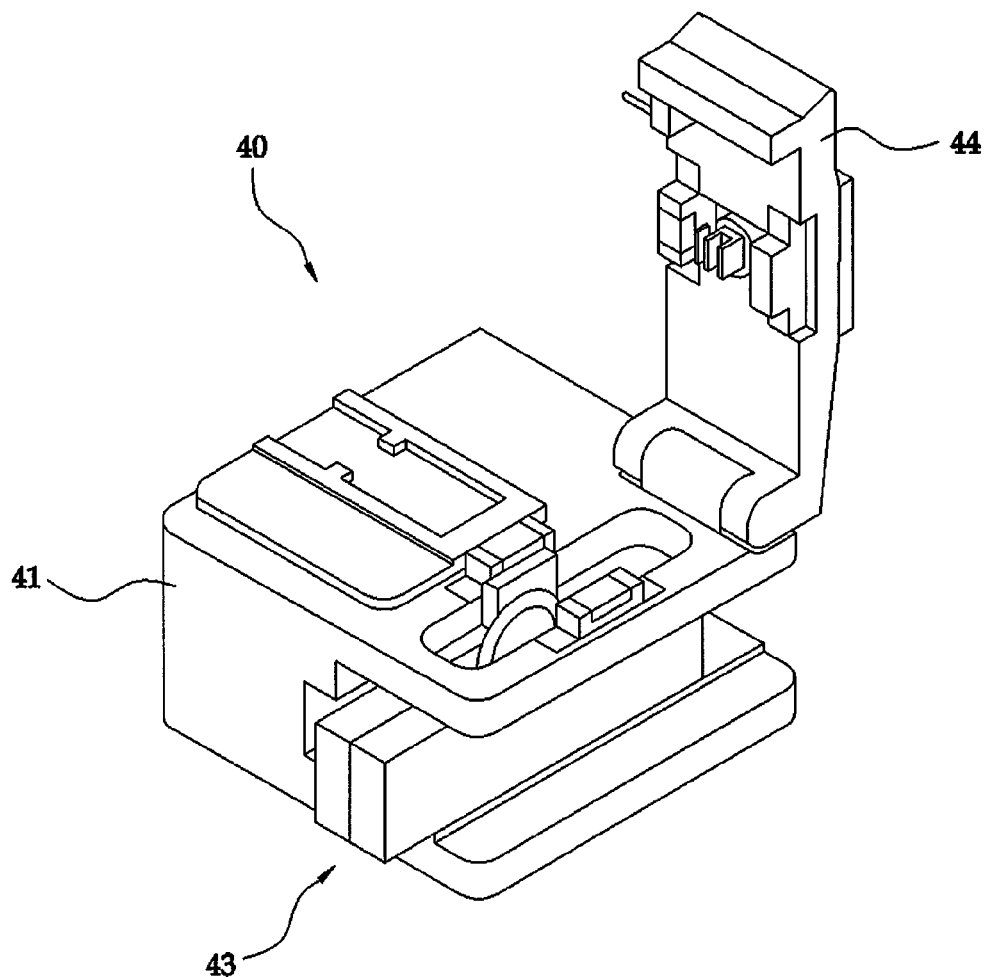
FIG. 8 is a partial perspective view showing an optical fiber cutting unit of the portable optical fiber processing apparatus according to the present invention.

FIG. 8 is a partial perspective view showing the optical fiber cutting unit of the portable optical fiber processing apparatus according to the present invention.

The optical fiber cutting unit 40 includes a sliding cutter 43, which is provided on a main body 41 and moves in a direction perpendicular to the longitudinal direction of the optical fiber (R) to cut at an appropriate position the portion of the optical fiber (R) from which the sheathing has been stripped, and a cutting cover 44, which is coupled to the main body 41 by a hinge, moves the sliding cutter 43, and provides compression force when cutting the optical fiber (R).

The optical fiber cutting unit 40 was proposed in Korean Patent Application No. 2003-26763 (entitled: optical fiber cutter), which was filed by the inventor of the present invention. In the optical fiber cutting unit 40, after the optical fiber (R) is placed on the main body 41, the sliding cutter 43 is moved merely by closing the cutting cover 44, thus a desired portion of the optical fiber (R) is cut by the compression force of the cutting cover 44.

Figure 9:
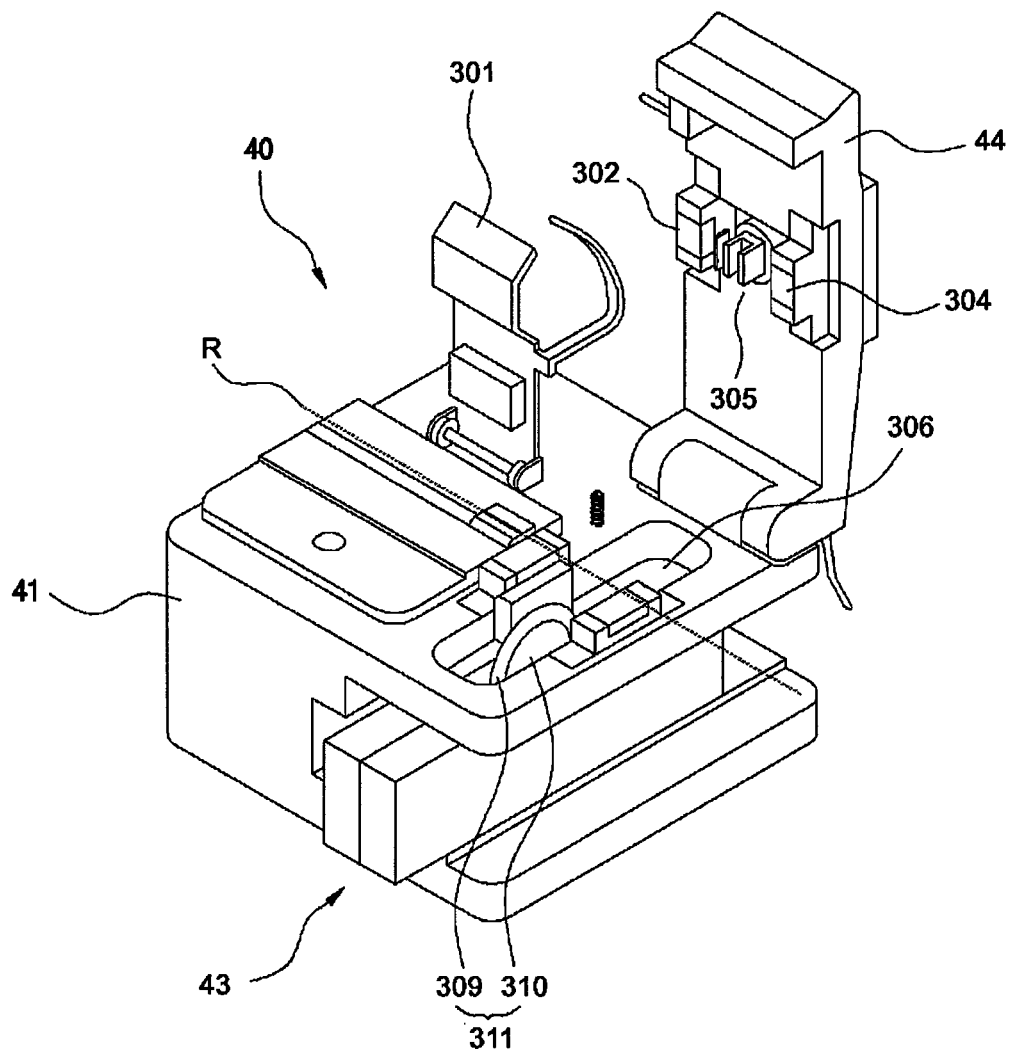
FIG. 9 is a partial perspective view showing another example of the optical fiber cutting unit used in the portable optical fiber processing apparatus according to the present invention.

FIG. 9 is a partial perspective view showing another embodiment of the optical fiber cutting unit of the portable optical fiber processing apparatus according to the present invention.

In this case, the optical fiber cutting unit includes a cutting device 40, a compression support unit 80 and a chip collection drive unit 90. The cutting device 40 includes a cutting main body 41 and a sliding cutter 43. The cutting main body 41 holds the optical fiber (R) on an upper surface thereof using a holding means. A cutting cover 44 is coupled to the cutting main body 41 so as to be openable on a line which longitudinally extends from the held optical fiber (R).

In this embodiment, both a subsidiary cover 301, which is hinged to the upper surface of the cutting main body 41 to hold a first portion of the optical fiber (R), and support members 302 and 304, which are provided under the cutting cover 44 to hold a second portion of the optical fiber (R), are used as the holding means. In other words, the subsidiary cover 301 and the support member 304 hold the first and second portions of the optical fiber (R). For this, the subsidiary cover 301 and the support member 304 are provided at positions that are approximately parallel to each other in the longitudinal direction of the optical fiber (R).

Here, only one support member 304 may be provided, or, more preferably, several support members 304 may be provided at positions spaced apart from each other such that a pushing member 305 is placed therebetween.

The pushing member 305 strikes the optical fiber (R), which has been scratched by a cutting blade, which will be explained later herein, thus substantially cutting the optical fiber (R). The pushing member 305 is provided under the cutting cover 44 such that the pushing member 305 is elastically biased downwards by a spring or the like. The cutting blade 311 includes a blade body 309 and a reinforcing plate 310.

Figure 10:
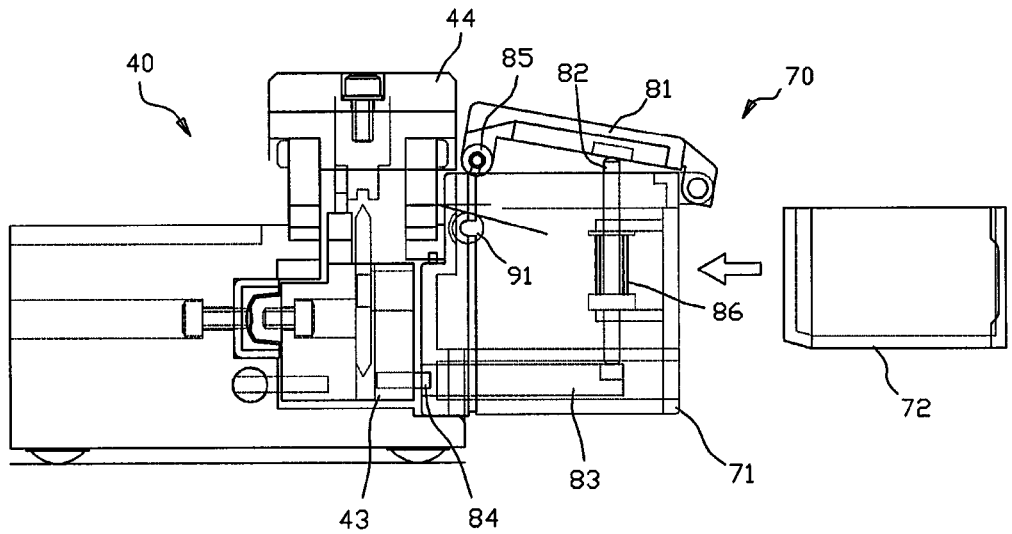
FIG. 10 is a schematic sectional view showing the optical fiber cutting unit of FIG. 9.
Figure 11:
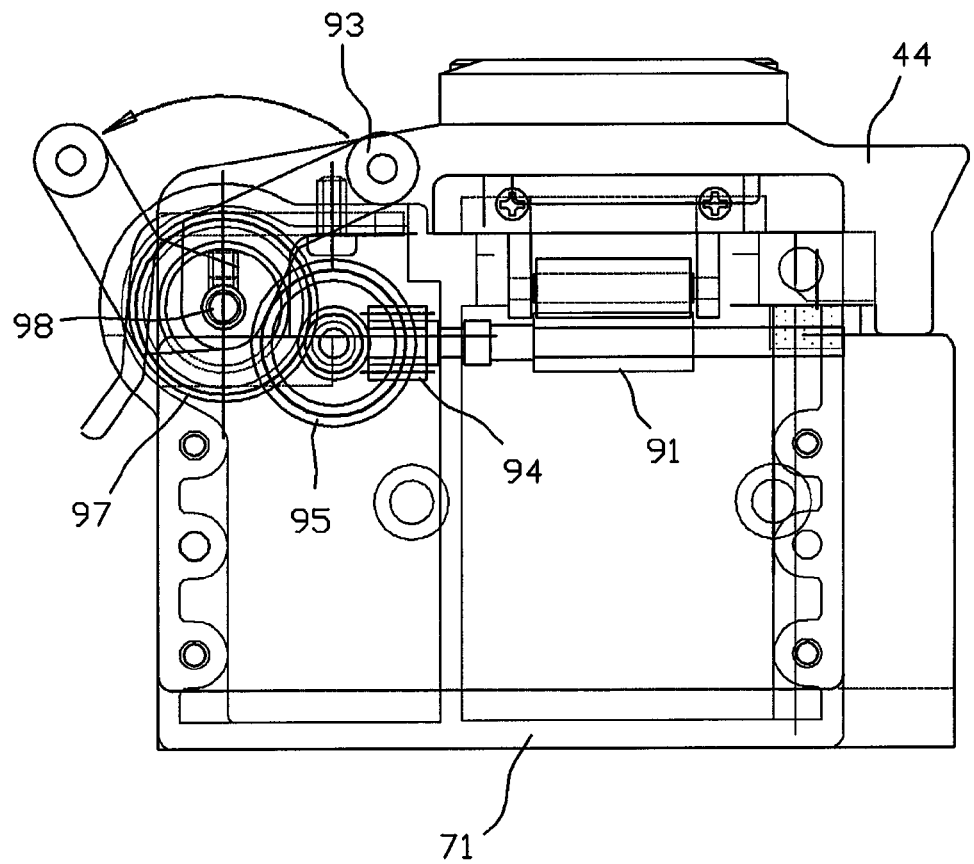
FIG. 11 is a schematic side view showing a compression support unit and a chip collection drive unit constituting the optical fiber cutting unit.
Figure 12:
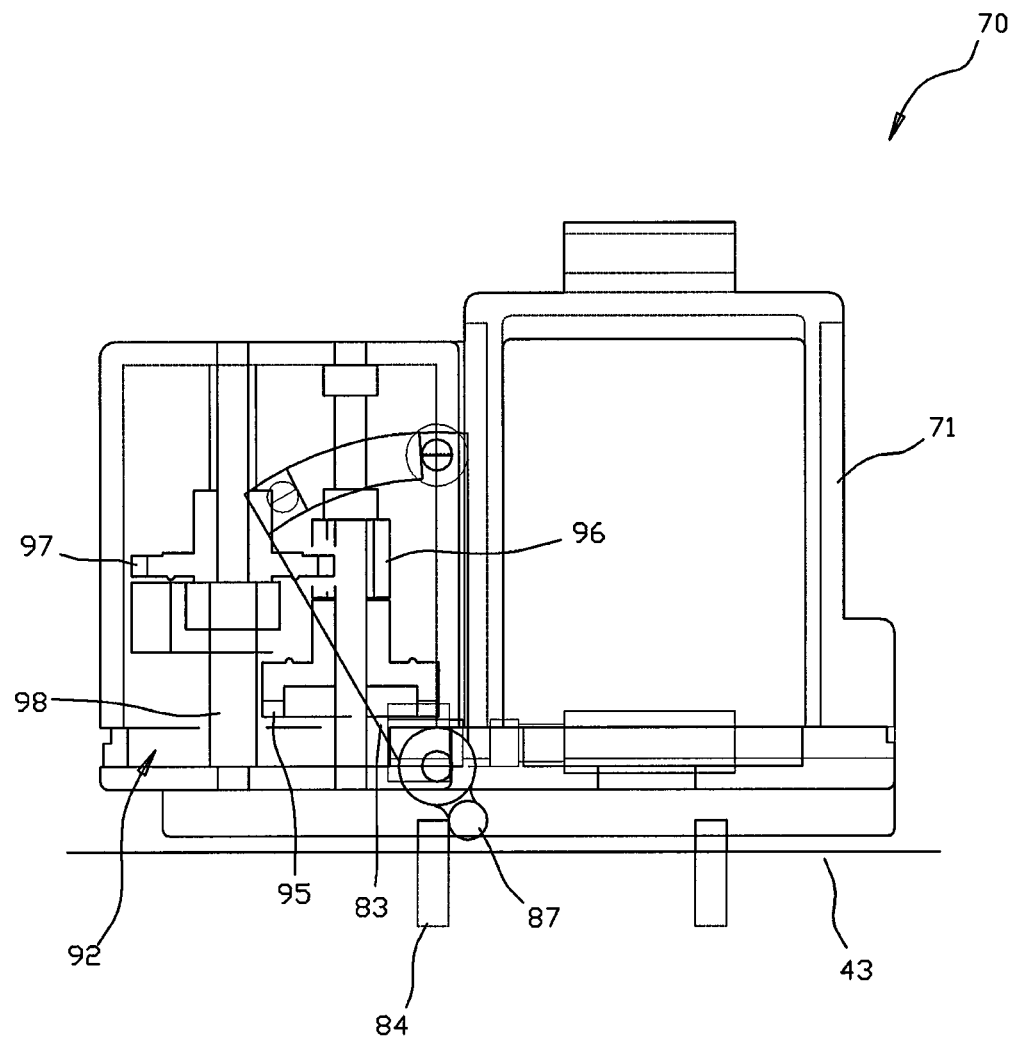
FIG. 12 is a schematic plan view of the optical fiber cutting unit including the compression support unit and the chip collection drive unit of FIG. 11.
Figure 13:
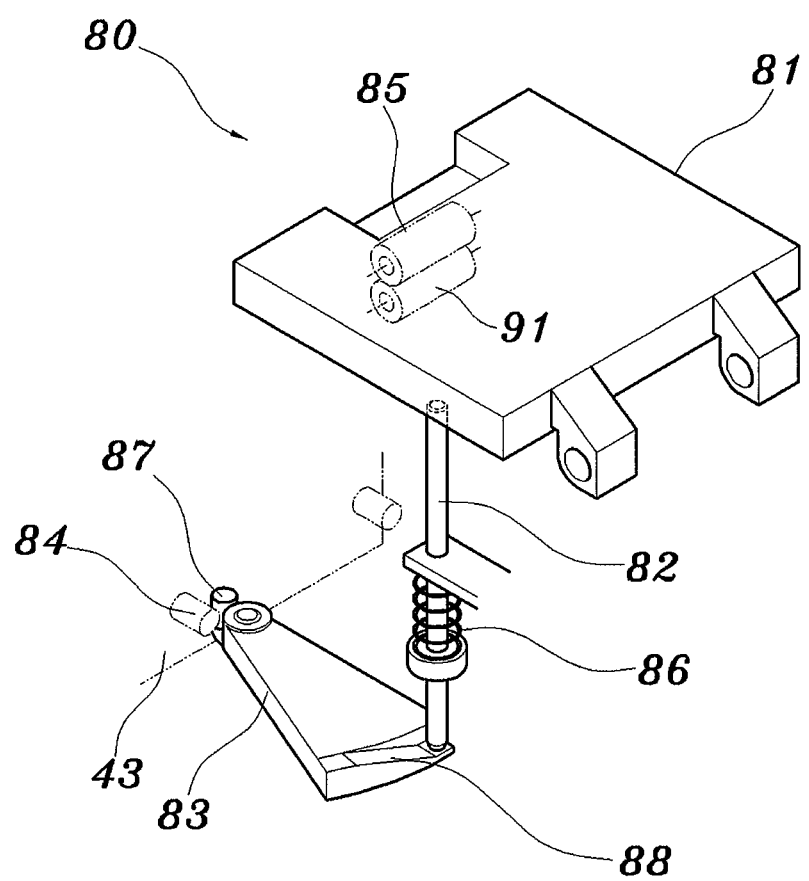
FIG. 13 is a partial perspective view of the compression support unit of FIGS. 11 and 12.
Figure 14:
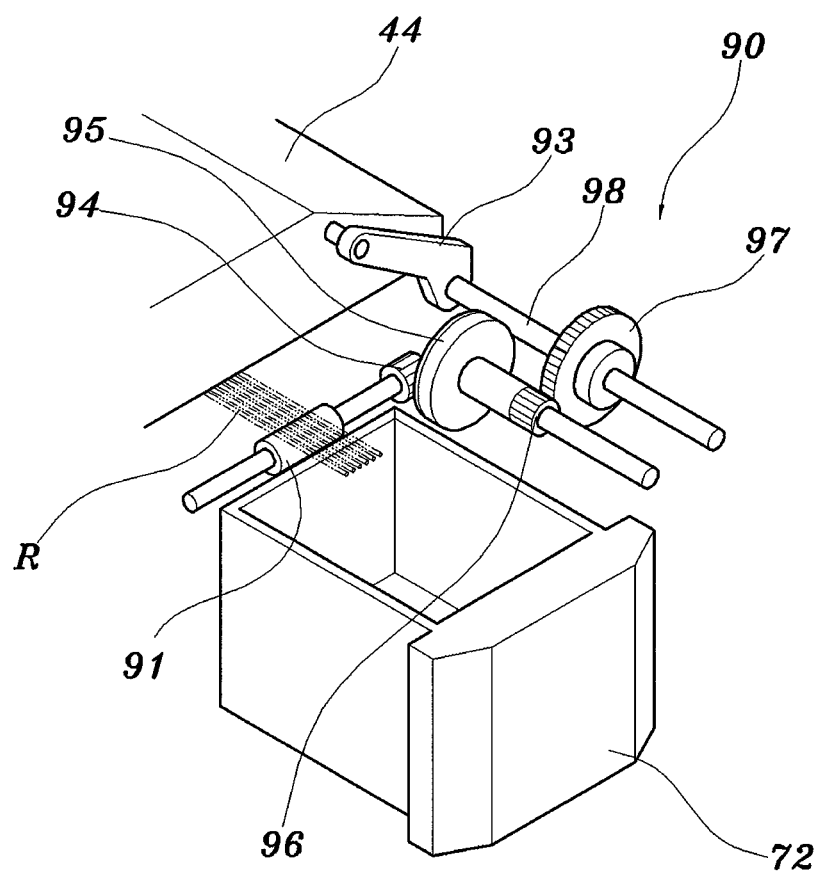
FIG. 14 is a partial perspective view of the chip collection drive unit of the optical fiber cutting unit.

FIG. 10 is a schematic sectional view showing the optical fiber cutting unit including a chip collection unit according to the present invention. FIG. 11 is a right side view showing the compression support unit and the chip collection drive unit of the optical fiber cutting unit according to the present invention. FIG. 12 is a plan view showing the compression support unit and the chip collection drive unit of the optical fiber cutting unit. FIG. 13 is a perspective view showing only the compression support unit of the optical fiber cutting unit. FIG. 14 is a perspective view showing only the chip collection drive unit of the optical fiber cutting unit.

In the present invention, the chip collection unit 70 is coupled to a side of the optical fiber cutting unit 40 and serves to collect cut optical fiber chips. That is, the chip collection unit 70 is coupled to a predetermined side portion of the optical fiber cutting unit 40 at which chips are generated, so that cut chips are collected in the chip collection unit 70. Thereby, cut optical fiber chips are removed by operation in conjunction with the cutting cover 44.

In detail, the chip collection unit 70 includes a chip collection main body 71, a chip collection container 72, the compression support unit 80 and the chip collection drive unit 90. The chip collection main body 71 is coupled to the main body of the optical fiber cutting unit 40 at a predetermined position at which optical fiber chips are generated. Here, the coupling of the chip collection main body 71 to the optical fiber cutting unit is realized using a coupling means such as a bolt, such that it is removable.

The collection container 72 is removably provided in the chip collection main body 71 and is open at an upper end thereof, at which an end of the optical fiber (R) is positioned such that it can be inserted into the collection container 72.

The compression support unit 80 includes a compression cover 81, a connection member 82 and a cam 83 which are provided in the chip collection main body 71. The compression support unit 80 further includes a striking member 84, which is coupled to the slide cutter 43 of the optical fiber cutting unit 40.

The compression cover 81 is hinged at a first end thereof to the upper end of the chip collection main body 71, and a roller 85 is rotatably provided on a second end of the compression cover 81, so that the roller 85 compresses the optical fiber (R).

The connection member 82 protrudes outside the upper end of the chip collection main body 71 and is constructed such that an end thereof can be advanced from and retracted into the chip collection main body 71. Furthermore, the connection member 82 includes a spring 86, which is provided in the chip collection main body 71 such that it is biased downwards by elasticity of the spring 86.

The cam 83 is rotatably coupled at a first end thereof to a side (the bottom when viewed in the drawing) of the chip collection main body 71. A stop protrusion 87 is provided at a position adjacent to the sliding cutter 43, so that, when the striking member 84 contacts the stop protrusion 87, drive force is generated. Furthermore, the cam 83 is enlarged in width at a second end thereof, and an inclined surface 88 is formed on the upper surface of the second end of the cam 83 so as to move the connection member 82 upwards and downwards.

The striking member 84 comprises a pair of striking members, which are provided on the sliding cutter 43 of the optical fiber cutting unit 40 at positions adjacent to the sides of the cam 83 and are spaced apart from each other by a predetermined distance. Here, the striking members 84 are spaced apart from each other by the predetermined distance appropriate to rotate the cam 83 at a predetermined angle when one striking member strikes the stop protrusion 87 of the cam 83 by sliding motion of the sliding cutter 43 of the optical fiber cutting unit 40.

The chip collection drive unit 90 includes a drive roller 91, a power transmission mechanism 92 and a connection lever 93.

The drive roller 91 is mounted to the chip collection main body 71 at a position facing the roller 85 of the compression cover 81. The drive roller 91 supports the lower portion of the optical fiber (R) and is rotatably provided to move a cut chip (meaning a scrap or waste material to be discarded after being cut) of the optical fiber (R).

The power transmission mechanism 92 includes a pinion 94, which is provided on the shaft of the drive roller 91, and a double crown gear 95, which is rotatably coupled to the chip collection main body 71 to engage with the pinion 94, and is provided with a pinion 96 on the coaxial shaft thereof. The power transmission mechanism 92 further includes a spur gear 97, which is rotatably coupled to the chip collection main body 71 to engage with the pinion 96 of the crown gear 95.

The connection lever 93 is coupled at a first end thereof to a shaft 98, on which the spur gear 97 is provided, and is coupled at a second end thereof to the cutting cover 44 of the optical fiber cutting unit 40, so that, when the cutting cover 44 is opened or closed, the connection lever 93 is rotated in conjunction with the cutting cover 44.

In the chip collection unit 70, when the compression cover 81 is opened so that the roller 85 and the drive roller 91 enter the state of being spaced apart from each other, the optical fiber (R) is placed on the drive roller 91 (see, FIG. 14).

In this state, the cutting cover 44 of the optical fiber cutting unit 40 is opened, and the optical fiber cutting unit 40 maintains the state of being moved to the front position. At this time, the striking member 84 of the sliding cutter 43 strikes the stop protrusion 87 of the cam 83 and maintains the state of compressing it.

Furthermore, the connection member 82, which is in contact with the cam 83, moves down the inclined surface 88 and maintains the state of FIG. 12. Due to the downward movement of the connection member 82, the roller 85 of the compression cover 81 pushes the cut chip of the optical fiber downwards.

In this state, the chip of the optical fiber (R) maintains the state of being compressed and held between the drive roller 91 and the roller 85. When the cutting cover 44 is rotated at a predetermined angle, the connection lever 93 is rotated along with the cutting cover 44, so that the drive roller 91 is rotated.

In detail, the spur gear 97 is rotated by the rotation of the connection lever 93. The pinion 96 and the crown gear 95, which is integrated with the pinion 96, are rotated by the rotation of the spur gear 97. The pinion gear 94, which is fitted over the same shaft as that of the drive roller 91, is rotated by the rotation of the crown gear 95. As a result, the drive roller 91 rotates and moves the chip of the optical fiber (R) towards the collection container 72, thus completing the chip collection process.

Thereafter, when the cutting cover 44 of the optical fiber cutting unit 40 is opened to conduct a subsequent process, the connection lever 93 and the drive roller 91, which is coupled to the connection lever 93, are rotated. When the sliding cutter 43 is moved forwards by opening the cutting cover 44, the cam 83 is rotated by movement of the striking member 84. Thereby, the connection member 82 and the compression cover 81 enter the initial state of FIG. 12 and remain that way.

The sliding cutter 43 is installed in the cutting main body 41 such that it slides in the lateral direction of the optical fiber (R) along a slide slot 306, which is formed at a predetermined position in the cutting main body 41. The cutting blade 311, which is provided on the upper end of the sliding cutter 43, protrudes outside through the slide slot 306, which is formed in the cutting main body 41, so as to cut the optical fiber (here, cutting the optical fiber means forming a temporarily cut state by scratching the optical fiber). The several striking members protrude from the side surface of the sliding cutter 43 at positions spaced apart from each other. Of course, the striking members are exposed outside through the slide slot 306.

FIG. 13 is a perspective view showing only the compression support unit of the optical fiber cutting unit according to the present invention.

The compression support unit 80 includes the chip collection main body 71, the compression cover 81, the connection member 82 and the cam 83.

The chip collection main body 71 is coupled to the cutting main body 41 at a position adjacent to the sliding cutter 43. The collection container 72, which receives and temporarily contains chips of optical fibers (R), is removably placed in the chip collection main body 71. Here, the well known drawer type installation method may be used as a method of removably installing the collection container 72.

As described above, the collection container 72 serves to collect chips of the optical fibers (R). Therefore, the collection container 72 must be placed at a position corresponding to the end of the optical fiber (R) when viewed in the plan view, such that chips cut from the optical fiber (R) can fall into the collection container 72.

The compression cover 81 is hinged at the first end thereof to the upper end of the chip collection main body 71 so as to openably close the chip collection main body 71. The roller 85 is rotatably provided under the lower surface of the second end of the compression cover 81, so that the roller 85 compresses the upper part of the optical fiber (R).

The connection member 82 has an approximately longitudinal cylindrical shape, and the end thereof (the upper end when viewing the drawing) contacts the compression cover 81 above the chip collection main body 71. Furthermore, the connection member 82 is elastically biased downwards by the spring 86, which is an elastic member provided in the chip collection main body 71.

The cam 83 has an approximately sectorial shape and is rotatably coupled to the chip collection main body 71. Here, the inclined surface 88, which moves the connection member 82 upwards and downwards, is formed on the second end of the cam 83. As well, the stop protrusion 87, which interferes with the striking members 85 of the sliding cutter 43 as explained above, is provided on the first end of the cam 83, so that the cam 83 is rotated by sliding movement of the sliding cutter 43.

FIG. 14 is a perspective view showing only the chip collection drive unit of the optical fiber cutting unit according to the present invention.

The power transmission mechanism of the chip collection drive unit can be realized by various mechanical models based on a technique in which the drive roller 91 is rotated in conjunction with rotation of the connection lever 93. Here, to accomplish the smallness of the volume of the optical fiber cutting unit and operational precision thereof, it is preferable that the power transmission mechanism have the following construction.

Preferably, the power transmission mechanism includes the pinion 94, which is provided on the shaft of the drive roller 91, the double crown gear 95, which is rotatably coupled to the chip collection main body to engage with the pinion 94 and is provided with the pinion 96 on the coaxial shaft thereof, and a spur gear 97, which is rotatably coupled to the chip collection main body 71 through the rotating shaft 98 to engage with the pinion 96 of the crown gear 95.

Here, the rotating shaft 98 of the spur gear 97 is securely coupled to the connection lever 93, so that the rotating shaft 98 is integrally rotated along with the connection lever 93.

Meanwhile, preferably, the slide cutter 43 and the cutting cover 44 of the cutting unit, which have been described above, are operated in conjunction with each other, so as to realize a convenient cutting process, in which the optical fiber (R) can be cut merely by closing the cutting cover 44, and so as to realize a convenient optical fiber chip (the part cut from the optical fiber) collecting process which is realized by operational connection between the cutting cover 44 and the chip collection drive unit 90, operational connection between the sliding cutter 43 and the compression support unit 80 and direct/indirect operational connection between the chip collection drive unit 90 and the compression support unit 80. In other words, the present invention is constructed such that the sliding cutter 43 and the cutting cover 44 of the cutting unit 40 are operated in conjunction with each other, and the chip collection drive unit 90 and the compression support unit 80 are indirectly coupled to each other.

The chip collection drive unit 90 includes the drive roller 91, the connection lever 93 and the power transmission mechanism 92. The drive roller 91 is mounted to the chip collection main body 71 at a position facing the roller 85 of the compression cover 81. Thus, the roller 85 supports the upper portion of the optical fiber (R), and the drive roller 91 supports the lower portion of the optical fiber (R).

Figure 15:
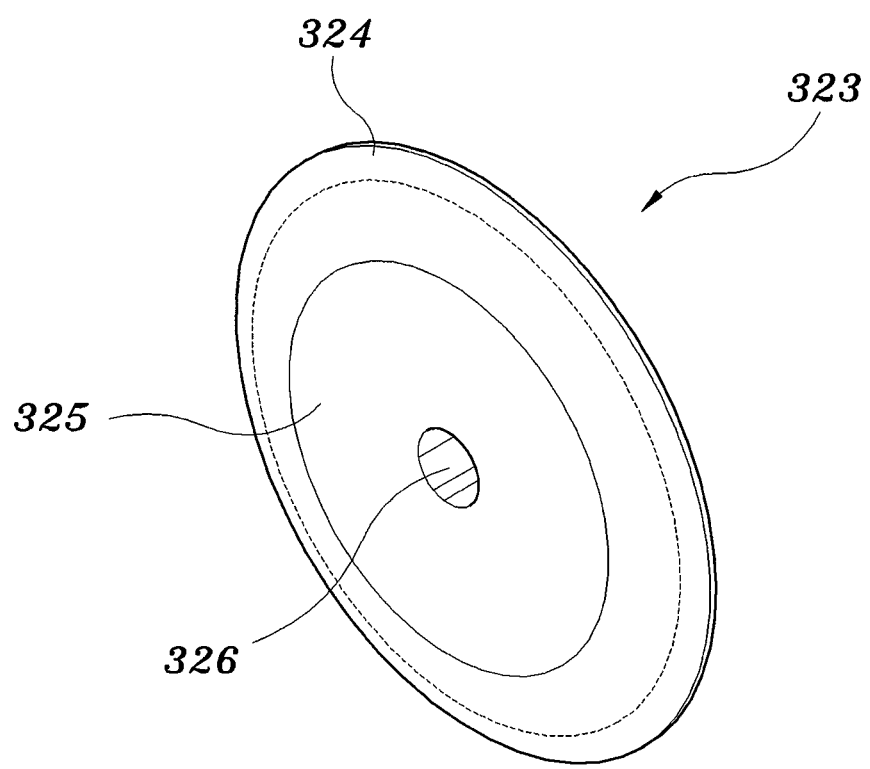
FIG. 15 is a perspective view showing the external shape of a cutting blade according to the present invention.
Figure 16:
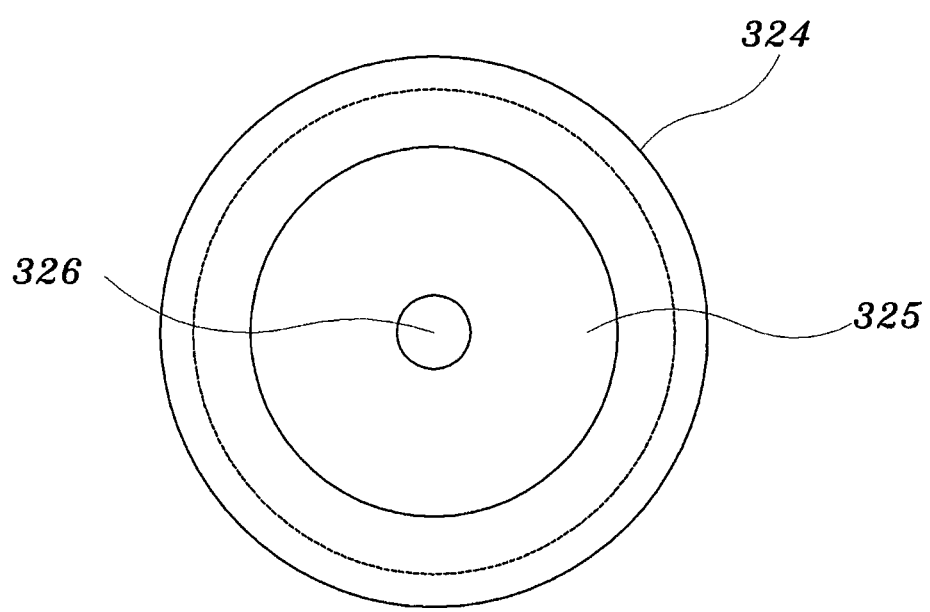
FIG. 16 is a side view of the cutting blade of FIG. 15.
Figure 17:
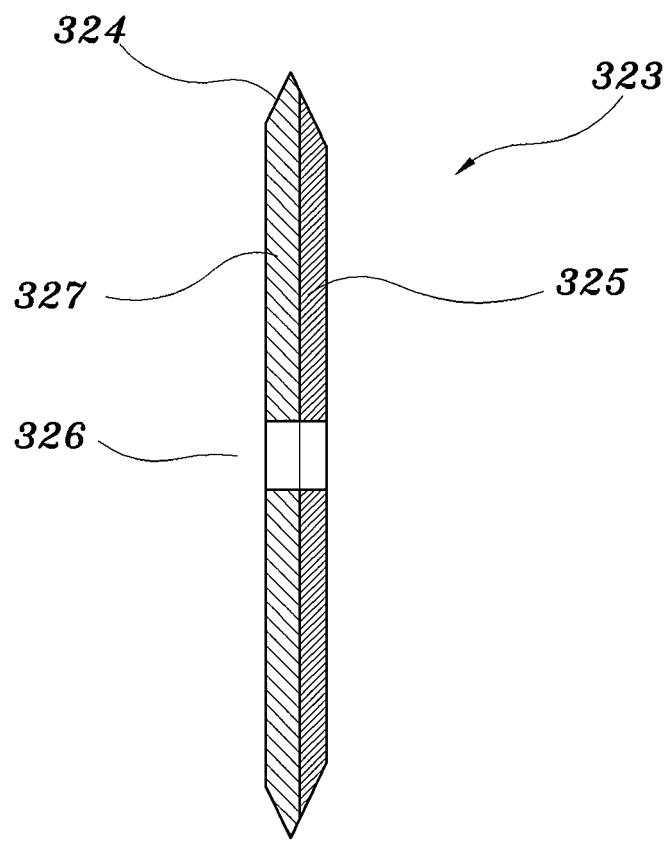
FIG. 17 is a sectional view of the cutting blade of FIG. 15.

The connection lever 93 is coupled to the cutting cover 44 of the cutting unit 40, so that the connection lever 93 is rotated in conjunction with the cutting cover 44 depending on the rotation of the cutting cover 44. The power transmission mechanism couples the drive roller 91 to the connection lever 93, such that the drive roller 91 can be rotated by rotation of the connection lever 93. FIG. 15 is a perspective view showing the external shape of the cutting blade of the optical fiber cutting unit according to the present invention. FIG. 16 is a side view of FIG. 15. FIG. 17 is a sectional view of FIG. 15.

The cutting blade of the present invention will be described on the basis of FIG. 17. The cutting blade 323 includes the blade body 327, which has a disc shape and is made of synthetic diamond. An edge part 324, which is reduced in thickness from the inside to the outside, is formed on the circumferential outer part of the blade body 327. The cutting blade 323 further includes the reinforcing plate 325, which is made of cemented carbide alloy and is bonded to one side surface of the blade body. Here, the reinforcing plate 325 is bonded to the surface of the blade body other than the edge part of the blade body.

As such, the cutting blade 323 includes the blade body 327 and the reinforcing plate 325. The blade body 327 has an approximate disc shape. The edge part is formed on the circumferential outer surface of the blade body 327 by inclining opposite sides of the center of the width (the thickness which is perpendicular to the diametrical direction). In other words, the edge part is formed by reducing in thickness of the blade body 327 from the inside to the outer edge, thus forming a sharp edge.

In the present invention, the blade body 327 substantially contacts the optical fiber (R) during the process of cutting the optical fiber (R). The blade body 327 must have high stiffness such that it is prevented from wearing and being damaged by repeated contact with the optical fibers (R). Preferably, the blade body 327 is made of synthetic diamond.

Here, synthetic diamond, which is PCD (poly crystalline diamond) or PCBN (poly crystalline cubic boron nitride) and is made through a CVD (chemical vapor deposition) method, may be used as synthetic diamond for the blade body 324.

Of them, in consideration of usefulness and price, the blade body 327 is preferably made of PCD synthetic diamond.

The reinforcing plate 325 is attached to one surface of the blade body 327 to reinforce the blade body 327. The outer edge part of the reinforcing plate 325 is inclined at the same angle as is the edge part of the blade body 327, so as to form a continuous shape. The reinforcing plate 325 having the above-mentioned structure is attached to one surface of the blade body 327 other than the edge part of the blade body 327.

Preferably, the reinforcing plate 325 is made of cemented carbide alloy including tungsten carbide (WC) and cobalt (Co). Thus, when the reinforcing plate 325 is attached to the blade body 327, cobalt, which is contained in the cemented carbide alloy constituting the reinforcing plate 325, serves to hold the diamond of the blade body 327, so that the reinforcing plate 325 can be securely attached to the blade body 327.

Thanks to the above-mentioned structure of the cutting blade 323, the use of expensive synthetic diamond can be markedly reduced while still forming the desired width (the thickness) of the cutting blade 323. Furthermore, synthetic diamond is prevented from being damaged by other components used for supporting the cutting blade 323.

Furthermore, a coupling hole 326 is formed through the center of the cutting blade 323. Through this, the cutting blade 323 is rotatably coupled to the sliding cutter 43. That is, although not shown in the drawings, a shaft, which is fastened to the sliding cutter 43, is fitted into the coupling hole 326 of the cutting blade 323, thereby the cutting blade 323 is rotatably coupled to the sliding cutter 43. As such, because the cutting blade 323 is rotatably coupled to the sliding cutter 43, the portion of the cutting blade 323 that contacts the optical fibers (R) can vary, thus extending the lifetime of the cutting blade 323. Furthermore, after the portion of the cutting blade 323 that contacts the optical fiber (R) has been changed by rotating it, the cutting blade 323 must be fixed such that it is not further rotated. For this, a bolt (not shown) may be provided through the sliding cutter 43 such that an end of the bolt is in close contact with the reinforcing plate 325 of the cutting blade 323. Then, the cutting blade 323 is prevented from undesirably rotating.

Figure 18:
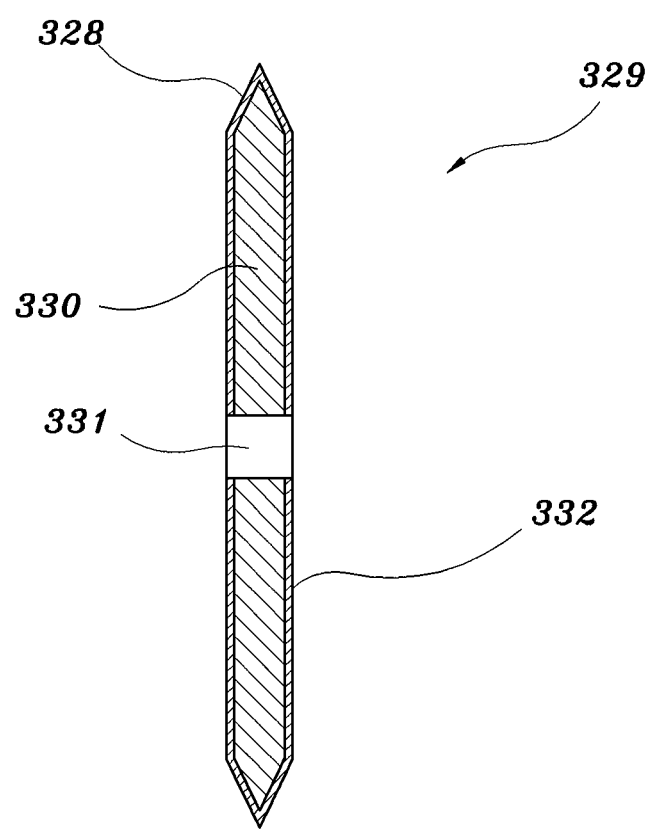
FIG. 18 is a sectional view showing another embodiment of the cutting blade.

FIG. 18 is a sectional view showing another embodiment of the cutting blade of the optical fiber cutting unit according to the present invention.

In this embodiment, a cutting blade 329 includes a blade body 330 and a synthetic diamond layer 332. The blade body 330 is made of relatively hard material, such as cemented carbide alloy or steel. Furthermore, the blade body 330 according to this embodiment has an approximate disc shape and has on the circumferential outer part thereof an edge part 328, which is reduced in thickness from the inside to the outer edge, in the same manner as that of the blade body of the previous embodiment.

The synthetic diamond layer 332 is formed by depositing synthetic diamond on the surface of the blade body 330 through a CVD (chemical vapor deposition) method. In this embodiment, the synthetic diamond layer 332 is formed on the entire surface of the blade body 330, but the synthetic diamond layer 332 may be formed only on the edge part 328 of the blade body 330 which substantially contacts the optical fiber, thus reducing the cost of manufacturing the cutting blade.

In the drawings, the reference numeral 331 denotes a coupling hole, through which the cutting blade 329 is rotatably coupled to the sliding cutter 43, in the same manner as that of the previous embodiment. Thanks to this construction, the amount of synthetic diamond which is used in the manufacture thereof can be reduced.

Figure 19:
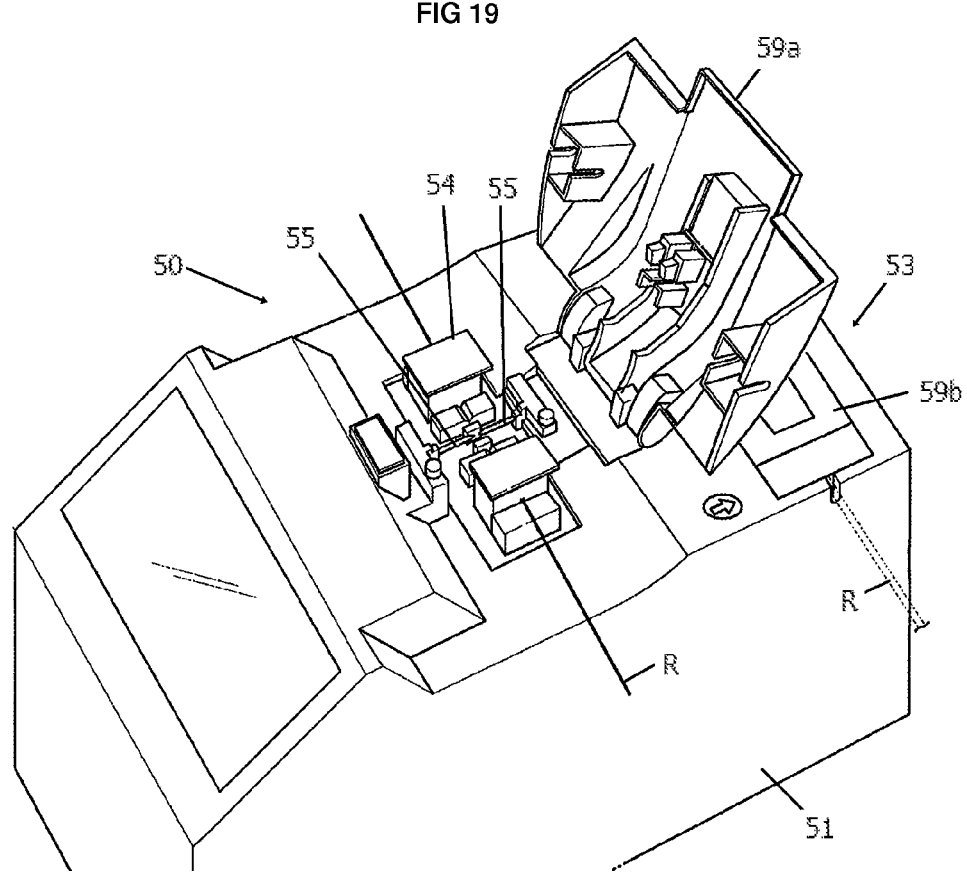
FIG. 19 is a perspective view showing a welding unit of the portable optical fiber processing apparatus according to the present invention.

FIG. 19 is a perspective view showing the welding unit of the portable optical fiber processing apparatus according to the present invention.

Referring to the drawing, the welding unit 50 includes a main body 51, which is provided at a predetermined position on the base 1, and a welding device 50, which is provided on the main body 51, so that, when two optical fibers (R), from which the sheathing has been stripped, and which have been cut, are placed such that the cut parts thereof face and contact each other, the welding device welds the junction therebetween. The welding unit 50 comprises a sleeve processing unit 53, which is disposed at a rear position on the main body 51, on which the welding device is provided, so that the sleeve processing unit 53 conducts a sleeve fitting process at the welded portions of the optical fibers (R).

The welding device 50 includes a pair of fiber mounting holders 54, which hold the respective optical fibers (R), and discharge electrodes 55, which are provided between the fiber mounting holders 54 at opposite sides of the optical fibers (R) in a direction perpendicular to the longitudinal direction of the optical fibers (R). When outside power is applied to the welding device 50, an electric arc occurs between the discharge electrodes 55. The junction portions between the optical fibers (R) are welded to each other by this electric arc. In the drawing, the reference character 59a denotes a welding cover which openably covers the welding device, and the reference character 59b denotes a chamber for a sleeve fitting process.

Figure 20:
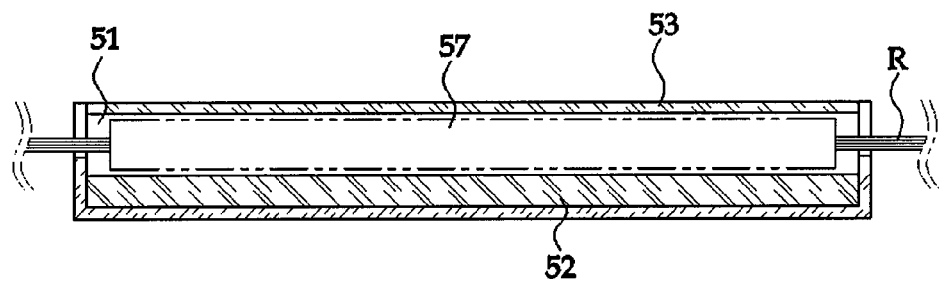
FIG. 20 is a sectional view of a sleeve processing unit provided in the welding unit of FIG. 19.

FIG. 20 is a sectional view of the sleeve processing unit provided in the welding unit of FIG. 19.

The sleeve processing unit 53 includes the chamber, which is defined in the main body 51 so that the sleeve fitting operation is conducted in the chamber, and a heating element 52, which is installed in the chamber to heat and weld the contraction sleeve 57. The contraction sleeve 57 is fitted over the welded junction part of the optical fiber (R) and is inserted into the chamber. Thereafter, the contraction sleeve 57 is heated by the heating element 52. Then, the contraction sleeve 57 is welded to the outer surface of the optical fiber (R), thus protecting the welded junction part of the optical fiber (R). As such, the above-mentioned chamber is formed for conducting the process of reinforcing the welded optical fiber.

Figure 21:
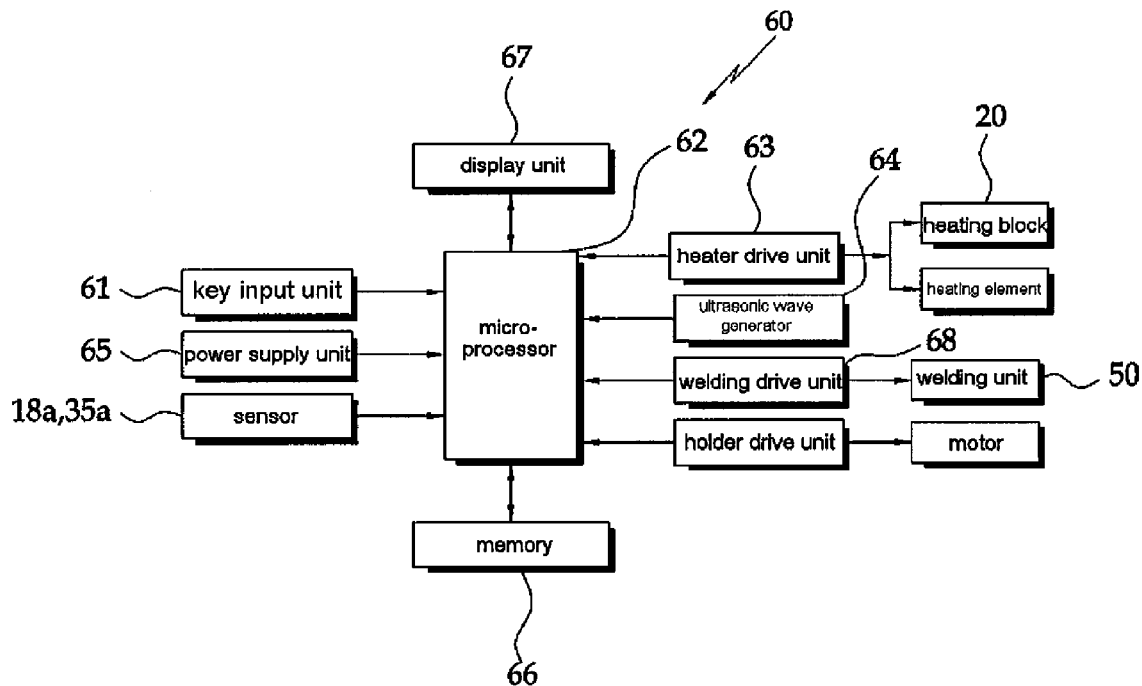
FIG. 21 is a block diagram of a control unit used in the portable optical fiber processing apparatus according to the present invention.
Figure 22:
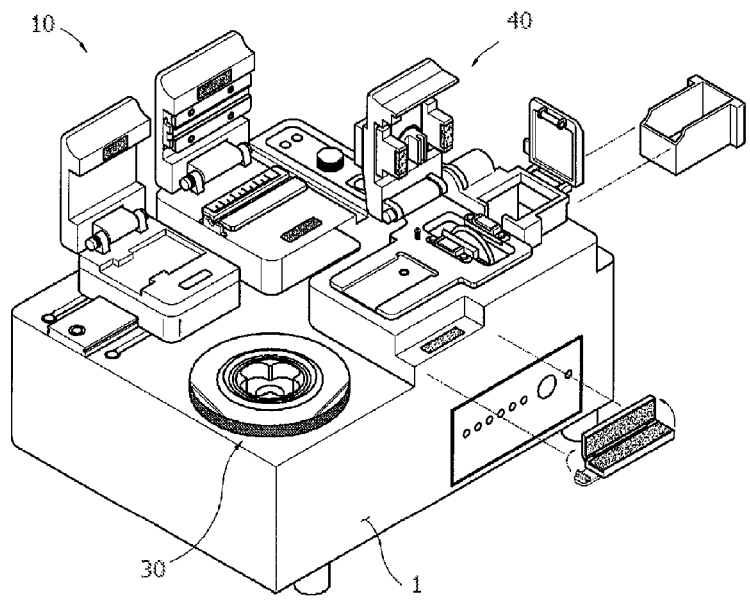
FIG. 22 is a perspective view showing another embodiment of the portable optical fiber processing apparatus according to the present invention.

FIG. 21 is a block diagram of the control unit used in the portable optical fiber processing apparatus according to the present invention.

Referring to the drawing, the control unit 60 includes a key input unit 61, which sets the control conditions of the sheathing stripping unit 10, the ultrasonic cleaning unit 30 and the welding unit 50, and a microprocessor 62, which is a control circuit that controls the components according to the input signals. The control unit 60 further includes a heater drive unit 63, which heats the heating block 20 of the sheathing stripping unit 10 using the control signals of the microprocessor 62 or using the input signals of the key input unit 61, the ultrasonic wave generator 64, which generates ultrasonic waves using the control signals of the microprocessor 62 or using the input signals of the key input unit 61, and a holder drive unit (not shown), which operates a motor (not shown) using the control signals of the microprocessor 62 or using the input signals of the key input unit 61.

Furthermore, the control unit 60 further includes a welding drive unit 68, which operates the welding devices of the welding unit 50 using the control signals of the microprocessor 62 or using the input signals of the key input unit 61.

The control unit further includes a power supply unit 65, which supplies power to the circuit, supplies power for operating the welding devices, supplies power required in a welding process, and supplies electricity to the heater drive unit 63, the ultrasonic wave generator 64 and the motor. The microprocessor has a memory 66, which stores the input and settings, and a display unit 67, which displays operating conditions of the components.

A battery is used as the power supply unit 65 to ensure the portability of the apparatus. It is preferable that a rechargeable power supply unit be used to reduce the expense required for batteries.

Meanwhile, a plurality of LEDs (light emitting diodes) or an LCD (liquid crystal display) may be used as the display unit 67. The display unit 67 indicates the start and completion of the sheathing stripping process, the ultrasonic cleaning process, the cutting process and the sleeve fitting process. In the case that the LEDs are used, the display unit has LEDs corresponding to the above-mentioned processes. The LEDs are constructed such that they are turned on or off in response to the time that the operation of the components is controlled by the microprocessor 62. The LEDs indicates these control conditions as characters.

What is claimed is:

1. A portable optical fiber processing apparatus, comprising:

a holder to hold an optical fiber such that an end of the optical fiber protrudes a predetermined length therefrom, the holder sliding on a main body; and a removable unit, comprising a protruding support body protruding from the main body, a stripping cover hinged to the protruding support body, and a stripping tool provided on each of the protruding support body and the stripping cover at a position corresponding to a position at which the protruding end of the optical fiber is positioned between the protruding support body and the stripping cover, thus stripping sheathing from the end of the optical fiber, the stripping tools having protrusions respectively provided on the protruding support body and the stripping cover so as to be in contact with each other, and stripping blades provided in the respective protrusions at positions facing each other;

wherein the holder is coupled to a rail provided on the main body and is moved by sliding means, and the sliding means comprises a motor installed in the main body, and a screw coupled both to an output shaft of the motor and to the holder such that the output shaft of the motor and the holder are operated in conjunction with each other, and wherein a distance at which the stripping blades are spaced apart from each other is within a range of $l_2 \leq L \leq l_2+(li-l_2)/3$, wherein L=distance between the stripping blades;

li=thickness of the optical fiber including a sheathing layer; and $l_2$=thickness of the optical fiber other than the sheathing layer.

2. The portable optical fiber processing apparatus according to claim 1, wherein the sheathing stripping unit comprises:

a stripping cover to heat an upper part of the optical fiber when the optical fiber is placed; and a sensor provided at a position facing the stripping cover at a predetermined position and constructed such that a time to heat the optical fiber is measured from when the stripping cover is closed.

* * * * *